United States Patent [19]

Hill et al.

[11] 4,336,607

[45] Jun. 22, 1982

[54] BEAMFORMER HAVING RANDOM ACCESS MEMORY DELAY

[75] Inventors: Eugene Hill, Cornwall, Canada; Arnolds Jansons, Indianapolis, Ind.; James J. Truchard, Austin, Tex.

[73] Assignee: The United States of America as represented by the Secretary of the Navy, Washington, D.C.

[21] Appl. No.: 214,830

[22] Filed: Dec. 10, 1980

[51] Int. Cl.$^3$ .............. G01S 3/80

[52] U.S. Cl. .............. 367/123; 367/126

[58] Field of Search .............. 367/105, 122, 123, 126, 367/135; 367/905

[56] References Cited

U.S. PATENT DOCUMENTS

| | | | |
|---|---|---|---|
| 3,449,711 | 6/1969 | Ricketts, Jr. et al. | 367/122 |
| 3,860,928 | 1/1975 | Ehrlich | 367/126 X |
| 3,927,388 | 12/1975 | Medrano | 367/124 |
| 4,001,763 | 1/1977 | Kits van Heyningen | 367/105 X |
| 4,031,501 | 6/1977 | Caruso | 367/124 X |
| 4,042,930 | 8/1977 | Parent | 367/122 X |
| 4,054,873 | 10/1977 | Parent | 367/122 X |
| 4,107,685 | 8/1978 | Martin et al. | 367/122 X |
| 4,170,766 | 10/1979 | Pridham et al. | 367/123 X |
| 4,274,148 | 6/1981 | van't Hullenaar | 367/905 X |

*Primary Examiner*—Richard A. Farley

[57] ABSTRACT

A device for forming beams for mulitple elements of a hydrophone array. An analog multiplexer receiver sequentially obtains one signal from each hydrophone and supplies input voltages to an analog to digital converter. Digital words from the converter are applied to one input of a digital adder and the other adder input is from the output of a random access memory (RAM). The output of the adder is stored in the RAM at an address corresponding to the signal time delay required from a particular hydrophone in order to direct the beam of the hydrophone array in a desired direction.

3 Claims, 2 Drawing Figures

BEAMFORMER HAVING RANDOM ACCESS MEMORY DELAY

BACKGROUND OF THE INVENTION

The present invention relates to a beamformer and more particularly to a device that forms beams by electrically delaying the signals from a plurality of hydrophones and then summing the delayed signals.

Implementation of sonar systems which have been designed and built for various applications has been accomplished with many different technologies and in many different configurations. In most applications, however, the signal from each element in the sonar receiving array must be delayed appropriately. The delay is used to eliminate the phase differences caused by differences in signal propagation time from signal source to individual hydrophone elements. After the delay, the signals, often shaded (weighted) to improve array beam characteristics (side lobe reduction) from each hydrophone are then added together. The beamformer of a sonar system is the unit which delays, shades, and sums the individual signals to form beams. The beamforming process is done either with time delays or with phase shifting so that signals from hydrophones are in phase with each other prior to their addition. For narrowband beamforming applications, a phase shift technique (phased array beamforming) is used to align the signals from each hydrophone. For broadband beamformers, the phase change over a broad frequency range is too great to be compensated for by phased array beamforming without degrading the performance. Thus, time delay beamforming is used in broadband systems.

Time domain beamforming in the conventional sense is achieved by delaying each array's hydrophone output signal (shaded if so required) by an appropriate time delay and then adding them. The sensor outputs are typically weighted (shaded) so that the beam's spatial response can be improved. In a time domain beamformer, time delays for each element are generally implemented in one of two ways. The first method is to delay each signal the appropriate amount and then sum all the signals. The second alternative is first to sum all incoming signals with some required time, delay the partial sums an incremental amount and sum them with the signals having the next longest delay, and then delay this composite signal the correct amount and sum it with signals from additional elements.

Originally, sonar technology was developed using analog devices. The beamformers built for the earliest sonars used analog delay lines and analog processing to implement the sum and delay type of beamformer. Networks of resistors were used to sum appropriate stave signals into delay line taps, and then beams were formed from the delayed signals at the output of each delay line. The earliest designs were refined by using capacitors instead of resistors at some points to improve response characteristics of the delay line. Further refinements included the addition of mechanical switches or capacitive plates to change the selection of the input elements. The number of beams that can be implemented easily is limited with either of these designs since each beam requires many delay lines. As a result, early beamformers often used scanning switches to sequentially look in all directions; however, performance was compromised. Only one beam was available at a given time. If the scanning rate was high, then the signals were degraded.

Only recently has the electronics industry provided the technology and the capability to build practical digital sonar systems. One of the earliest digital techniques applied to the problem of processing the output of an array of acoustic hydrophones was the digital multibeam steering system (DIMUS). In this system the signal from each element is filtered, equalized, and clipped prior to beamforming. Then digital shift registers are used for time delay so that the acoustic arrays may be steered. The output of each element is reduced to a sequence of polarity samples (1-bit data) and delayed by an integral multiple of the sampling period. Then the delayed sequences for all elements are added, squared, and smoothed.

The DIMUS system was first developed when digital hardware was in its infancy. Consequently there are some disadvantages in this system due to the requirement that the incoming signal be carefully equalized in amplitude prior to clipping. If this is not done, a single, strong frequency component will override all other components and cause considerable degradation of the beamformer. Furthermore, when a narrowband directional tone is present, it masks out all other signals. Because of this feature, it is easily jammed with a narrowband signal.

In order to have good sidelobe suppression and wide dynamic range in a digital system, line signal amplitude quantization (more than one bit) is required. By increasing the number of quantization levels, the requirements for data lines, storage media, sampling modules, and arithmetic processing are increased. Use of quadrature sampling allows minimization of sampling and processing requirements and the use of geometric representation of signals allows use of reasonable word sizes at the beamformer input.

The performance of the DIMUS type of beamformer can be greatly enhanced by replacing the clipper with an analog-to-digital (A/D) converter which thus provides information about the signal expressed in more than one bit words. When quantization with more bits is done, the dynamic range of the system is determined by the number of bits and capability will be improved substantially. However, the improvements have a practical limit. Electronic circuitry for this type of beamformer can become very complex as the number of quantization bits becomes large, because each signal has a number of lines equal to the number of associated bits. Improvements to the DIMUS beamformer can be made by using random access memory (RAM) instead of shift registers. This approach simplifies the electronics but places stringent speed requirements on the RAM. Consequently this type of system would be difficult to implement at this time in any practical applications.

A hybrid technique employing a discrete time, continuous voltage approach is to use a charge coupled device (CCD) for the delay function in delay and sum beamformers. The main advantages are that high speed A/D converters and memories are not needed and multiple beams can be formed in one device. The disadvantage of this approach is that the electronics are still complicated and the dynamic range of the beamformer is limited by the charge coupled device.

Another approach is to use high speed digital systems in which beamforming and scanning are done concurrently. In general, high speed digital scanning is practical only in narrowband systems where phase shift beamforming can best be used. Because only one cycle of phase shift is required to form a beam, phase shift networks can be used to shorten the length of the delay line. The main advantage of the phase shift approach is that it requires less hardware to implement and, therefore, costs less. A combination of digital phase shift beamforming with circular array geometry to provide a scanned beam output for narrowband waveforms has been shown to provide good dynamic range using minimal hardware.

SUMMARY OF THE INVENTION

The present invention relates to a random access memory delay beamformer system. Sound pressure signals are transformed into analog voltages in a hydrophone array and a sonar receiver includes amplifiers and filters to increase the voltage of the transformed signals and to separate desired frequencies from undesired frequencies. An analog multiplexer sequentially obtains one sample of each hydrophone signal after amplification and filtering and supplies input voltages to an analog-to-digital converter. The converter transforms voltages out of the multiplexer into digital words of binary numbers.

Digital words from the analog-to-digital converter are applied to an input latch and then to a digital multiplier for multiplication by a shading coefficient. Digital words from the shading multiplier are applied to one input of a digital adder and another adder input is supplied from an output of a random access memory. The digital word resulting from the addition of the two adder inputs is stored in the random access memory at an address corresponding to the required time delay as required for a particular hydrophone of the array to direct the array beam in a desired direction. Before being read out, the stored digital word in the random access memory is reapplied to the adder at any time hydrophone data, appropriate to be read out at the same time as earlier data, is available to the adder. This addition of new data to the older data stored in the random access memory forms an addressable accumulator.

It is therefore a general object of the present invention to provide an improved beamformer.

Another object of the present invention is to form beams by electrically delaying signals from an array of hydrophone and then summing the signals, with the signal addition and the time delay being accomplished by an arithmetic adder and a random access memory, respectively.

Other objects, advantages and novel features of the present invention will become apparent from the following detailed description of the invention when considered in conjunction with the accompanying drawing.

DESCRIPTION OF THE PREFERRED EMBODIMENT

Figure 1:
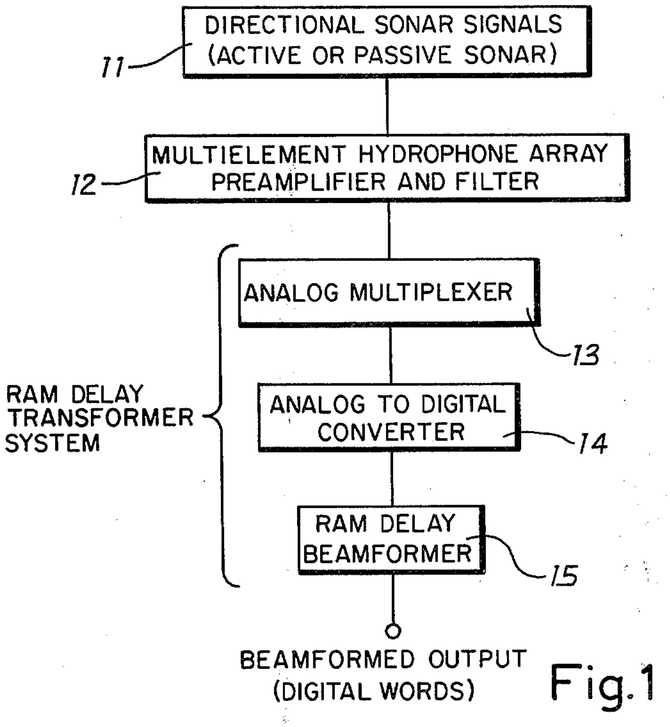
FIG. 1 is a block diagram of a sonar system.

Referring now to the drawing, in FIG. 1 there is shown a sonar receiver 11 that requires a directional receiving capability for maximum reception of a desired signal and maximum rejection of signals arriving from other directions. Sonar receiver 11 includes a hydrophone array of any conventional nature that is composed of two or more elements capable of transforming the sound pressure signals into electrical signals. The sonar receiver 11 also includes amplifiers and filters (item 12) to increase the signal level of the transformed signals and to separate the desired frequencies from undesired frequencies.

An analog multiplexer 13 first receives the input voltages to the RAM delay Beamformer 15. There are at least two hydrophone signals and there may be many more. The analog multiplexer 13 sequentially obtains one sample of each hydrophone signal after amplification and filtering. The samples are obtained in any predetermined order and additional samples are obtained as often as desired following the first set of samples.

Analog multiplexer 13 supplies the input voltages to an analog-to-digital converter 14, commonly abbreviated A/D. The A/D transforms the voltages out of the multiplexer 13 into digital words of common type, known as binary numbers. The binary numbers represent the value of the voltage applied to A/D 14 by the analog multiplexer 13. One digital word is produced for each voltage sample obtained by the analog multiplexer 13. The A/D 14 may produce digital words of any size appropriate for the voltage and frequency range over which the receiver is to function. The normal minimum digital word size is composed of 1 binary bit that serves only to indicate whether the analog voltage is of positive or negative polarity. A usual maximum digital word size is 8 to 16 binary bits. A digital word of 12 binary bits is commonly used for this and other applications with the negative polarity voltage indicated as −2048 and the most positive polarity voltage indicated as +2047. The actual voltage that these numbers represent is completely arbitrary, with the size of the numbers indicating only the number of voltage steps that A/D 14 is capable of indicating. If the signal voltage is larger than A/D 14 can linearly indicate, the signal voltage is clipped or limited to produce a maximum value indication, either positive or negative as appropriate, from A/D 14.

Figure 2:
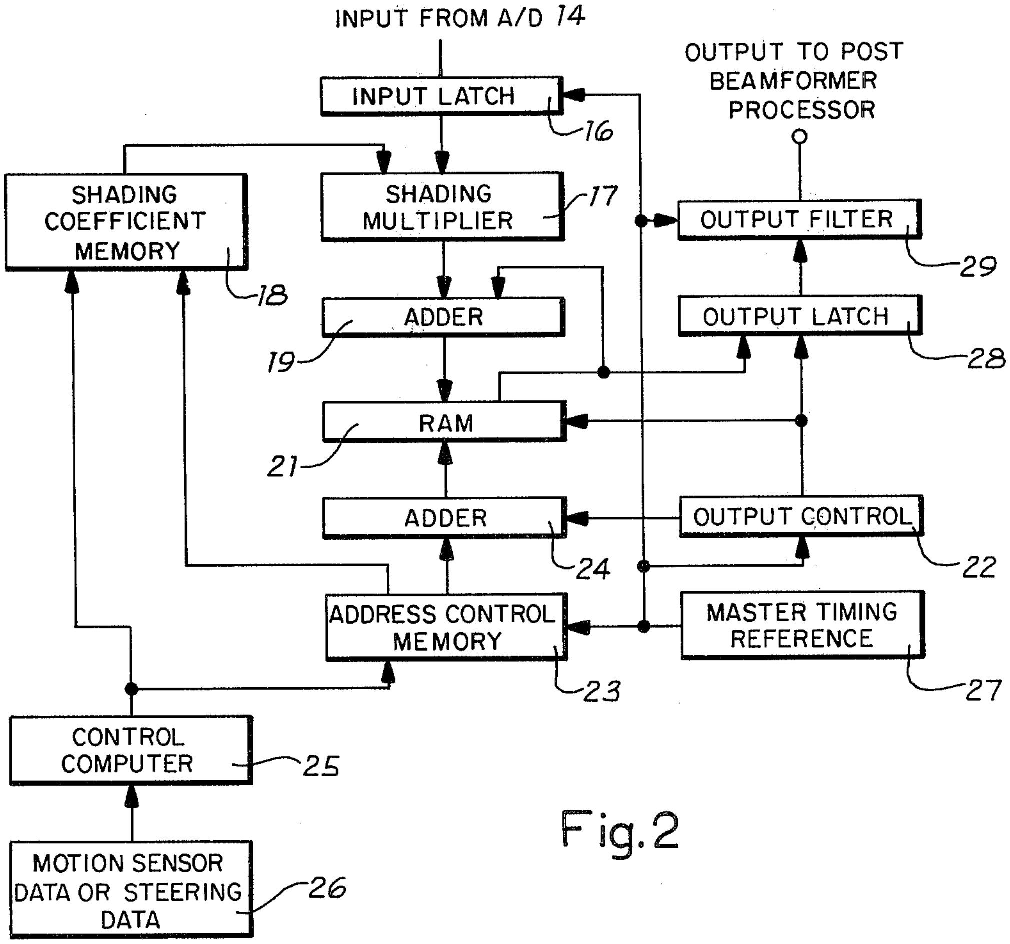
FIG. 2 is a block diagram of a beamformer system.

Referring now to FIG. 2 of the drawing, the beamformer 15 of the present invention is comprised of standard digital circuits arranged, connected, and controlled so as to produce output signals of high amplitude for signals originating from certain directions and to produce low amplitude output signals for signals originating from all other directions. This is accomplished by adding appropriate new signal samples to older signal samples previously stored in a random access memory (RAM). Digital words from A/D 14 are applied on an input latch 16 of beamformer 15 and then to a digital multiplier 17 for multiplication by a shading coefficient from memory 18, if shading is required for sidelobe reduction. This shading is optional since shading, if needed, can be obtained in other ways for some applications. The digital words from shading multiplier 17 are applied to one input of a digital adder 19 with the other adder input being the output of RAM 21. The digital word resulting from the addition of the two adder inputs is stored in RAM 21 at an address to be read out after a time delay equal to the remaining propogation time of a signal through the hydrophone array that is from the direction of the desired maximum beamformer response. Before being read out, the stored digital word in RAM 21 will be reapplied to adder 19 at any time hydrophone data that are appropriate to be read out at the same time as the earlier data are available to adder 19. This addition of new data (digital words) to the older data stored in RAM 21 forms an addressable accumulator.

Assuming that the hydrophone signals are sampled by multiplexer 13 in a fixed pattern and that the direction of maximum response desired in the beamformer relative to the hydrophone array does not change, the sequence of RAM 21 accesses for applying old data to adder 19 is a pattern that is fixed except for incrementing related to the signal delay time required. Output control 22 is a counter that increments at least once with each repeated set of hydrophone signal samples and resets at a count related to the maximum delay time required for the signals in the array. An address control memory 23 contains the address pattern that, when added by the adder 24 to the output control 22 count, will produce the appropriate memory address for RAM 21. Address control memory 23 contains the RAM 21 address sequence required to steer the maximum response axis of beam-former 15 to a selected direction relative to the hydrophone array 12. This sequence may be fixed and a Read Only Memory (ROM) used for memory 23, or the sequence may be changed to steer the directional formed beam to different directions. Steering to different directions, in general, requires that the address control 23 message be a RAM that is loaded with the appropriate digital words by a dynamic control computer 25 that contains an appropriate computer program to react to external signals such as motion sensors or manual steering commands 26 and then to load the address control memory 23 with the appropriate digital words.

When the optional shading multiplier 17 is used, with shading coefficients will normally be stored in a shading coefficient memory 18 which may be either a ROM or a RAM. If it is a RAM, it will also need to be loaded with appropriate digital words to obtain the desired sidelobe control. Control computer 25 can also load this memory, and upon appropriate command, can alter the shading coefficients to produce a specific response such as either super directivity or null steering. Additionally, control computer 25 can provide the appropriate address control sequence and shading coefficient for several beamformers since, in general, computer 25 can perform its calculations much more often than needed by one beamformer. A master timing reference 27 is required to maintain the timing in all the beamformers in a system.

After a RAM 21 memory address has been loaded with the last accumulation from adder 19, the data in that memory position needs to be read out to the output circuits and the memory reset to zero to be available for the next set of signal samples to be accumulated. The counter that forms the output control 22 includes the logic required to allow output latch 28 to store the digital word being read out from RAM 21 and to also reset the data at that RAM address to zero.

Output control 22 is a counter that increments at least once with each repeated set of hydrophone signal samples and resets at a count related to the maximum time of signal delay required. Each repetition of hydrophone signal samples, as obtained by analog multiplexer 13, must occur often enough to satisfy the frequency bandwidth sampling theorem by Shannon, and faster sampling may give more accurate results.

A signal propagating from a source to the hydrophone array from the desired maximum response direction arrives at the various hydrophones in the array at different times. Beamforming ia accomplished by delaying the signals from the first hydrophone encountered until the last hydrophone used for beamforming receives the signal, and then adding the signals together along with all the intermediate hydrophone signals also delayed appropriately. The amount of delay required is determined by the physical separation distance between the hydrophones as measured in the maximum response direction, and the speed of sound propagation in the material, usually water, where the array is located. The delay introduced to compensate for the propagation time differences to the individual hydrophones of the array must be accurate enough to allow the various hydrophone signals to properly add at all frequencies desired for beamforming. Errors in either time delay or signal amplitude result in increased sidelobe levels and a wider directional beam. However, time delay or amplitude errors can usually be made insignificant by choosing time delay steps and amplitude quantization steps sufficiently small that smaller steps do not result in noticeably improved beam patterns. Usually, satisfactory beam patterns are obtained with time delay steps equivalent to about $\frac{1}{4}$ the period of the highest frequency to be processed. While time delay increments much smaller than this are sometimes needed and do produce better beam patterns, the improvements are only seldom worth the cost of providing the smaller time delay steps.

RAM 21 must contain a sufficient number of addresses to provide a separate address for each time delay step with the sum of the time delay steps equal to or greater than the maximum time delay required for the beamformer. For example, a RAM with 64 address locations could be used with 40 μsec time delay steps and this provides a maximum time delay of 2.56 msec. If this same RAM were used with 10 μsec time delay steps, the maximum time delay would be limited to 640 μsec.

The time delay step does not have to equal the sampling repetition time of analog multiplexer 13, but if it does not, an output filter 29 is needed. If the time delay step is smaller than the sampling repetition period, each memory address will not accumulate a complete set of hydrophone samples. For example, assuming that the sampling repetition period is four times the time delay steps, four memory locations that would output consecutively would together contain one sample of each hydrophone used to form a beam. For this example, output control 22 would increment four times for each repeated set of hydrophone signal samples obtained by the analog multiplexer 13. Output filter 29 must interpolate to obtain the correct sample value at some reference time for each set of outputs, and then add the four interpolated values together to obtain the correct sample of the complete beamformer.

To further explain the actions required of output filter 29 when interpolation is required, additional explanation is as follows. Each of the four consecutive outputs applied to output filter 29 is a sample of a beamformer output where the beamformer used only some of the hydrophone elements available to it. In effect, the hydrophone array has missing elements that, in general, would produce beam patterns with very large sidelobes. However, the samples of the missing elements are available in the other three outputs of a consecutive set of four. Assuming that the signal to be beamformed is a sine wave, each sample output of the beamformer is a sample of a sine wave since the addition of sine waves always produces sine waves. If the beamformer sample outputs were applied to four digital-to-analog (D/A) converters and low pass filters, with one converter receiving every fourth output sample, after several samples have been converted and low pass filtered, analog sine waves would be present at the filter outputs. For signals arriving from the beamformer maximum response direction, the four sine waves would be in phase and could be summed and this would give a larger sine wave signal. For other directions, the four sine waves would have different phases and summing would not produce as large a sine wave signal as does the in-phase condition. The D/A converters and low pass filters convert the digital samples to analog signals and the low pass filters interpolate the sample values to supply correct instantaneous values between samples. The samples cannot be added directly without introducing error, since the samples are at different times. The digital filter 29 needed to accomplish this interpolation and addition can be any of several different types. It is different from standard digital low pass filters only because the output samples to be interpolated and added are interleaved with other samples. If the time delay step is equal to the sampling repetition period of the analog multiplexer 13, no filter 29 is needed. The signal does not need to be sine waves, but may be any waveform that does not contain frequencies greater than half the sampling rate.

Output filter 29 which serves as an interpolation filter is preferably a finite impulse response (FIR) filter which has an advantage over more conventional infinite impulse response (IIR) filters. FIR filters can be designed with precise linear phase while IIR filters cannot. FIR filters are optimal in the sense that the transition bandwidth is minimum for given values of passband and stopband ripple at specified passband and stopband cutoff frequencies. This advantage outweighs the computational advantage of IIR filters. A more complete comparison of IIR and FIR digital filters is given on pages 268 and 269 of the Text, "Digital Signal Processing" by Alan V. Oppenheim and Ronald W. Schafer, Prentice-Hall, Inc. 1975.

It can readily be seen that various advantages are realized by using the RAM delay beamformer of the present invention. The inclusion of the control computer 25 provides a unique capability of making the beamformer programmable to be used in a wide variety of conditions. Another unique feature is that a single input port is used for imputting data. This single input port minimizes the amount of wiring necessary for beam formation, and also the use of a high speed multiplexer 13 to input data to analog-to-digital converter 14 further minimizes the amount of required wiring.

Obviously many modifications and variations of the present invention are possible in the light of the above teachings. It is therefore to be understood that the invention may be practiced otherwise than as specifically described.

We claim:

1. A beamformer comprising, a sonar receiver having a plurality of spatially distributed hydrophones for transforming sound pressure signals into analog electrical signals, an analog multiplexer for sequentially obtaining said analog electrical signals from said sonar receiver, an analog to digital converter connected to said analog multiplexer for digitizing said analog electrical signals, a random access memory for storing digital words at an address to be read out after a time delay, and an adder having one input connected with an output of said analog to digital converter and another input connected with said random access memory and having an output connected with said random access memory.

2. A beamformer as set forth in claim 1 having an interpolation filter connected to an output of said random access memory for interpolating when the time delay step within said random access memory does not equal the sampling period of said analog multiplexer.

3. A beamformer as set forth in claim 2 wherein said interpolation filter is a digital finite impulse response filter.

* * * * *